United States Patent
Hoch et al.

[15] 3,693,238
[45] Sept. 26, 1972

[54] FRICTION WELDING OF ALUMINUM AND FERROUS WORKPIECES

[72] Inventors: Fred R. Hoch; James W. McIntee, both of Lower Burrell, Pa.

[73] Assignee: Aluminum Company of America, Pittsburgh, Pa.

[22] Filed: Oct. 2, 1970

[21] Appl. No.: 90,191

Related U.S. Application Data

[63] Continuation-in-part of Ser. No. 52,087, July 2, 1970, abandoned.

[52] U.S. Cl. ..................29/470.3, 156/73, 228/2
[51] Int. Cl. .............................................B23k 27/00
[58] Field of Search .............29/470.3; 228/2; 156/73

[56] References Cited

UNITED STATES PATENTS

| | | | |
|---|---|---|---|
| 3,269,001 | 8/1966 | Hollander | 29/470.3 |
| 3,121,948 | 2/1964 | Hollander et al. | 29/470.3 |
| 2,795,039 | 6/1957 | Hutchins | 29/470.3 |

*Primary Examiner*—John F. Campbell
*Assistant Examiner*—R. J. Craig
*Attorney*—Elroy Strickland

[57] ABSTRACT

A method of joining together an aluminum workpiece and a ferrous workpiece by relative rotation of the workpieces while the workpieces are forced together at mutually engaging parallel, planar surfaces. The surfaces are thereby frictionally heated, and sufficient axial pressure is applied to the workpieces to pressure weld them together at the interface of the planar surfaces using an amount of rotational, kinetic energy input to the weld area in the range of about 3,500 to 5,500 pounds per square inch of weld area. The compressive yield strength of the aluminum alloy workpiece at the temperature to which the planar surfaces are heated by the rotational energy is such that the amount of metal of the aluminum workpiece radially displaced at the interface is less than 10 percent of the weld area.

2 Claims, No Drawings

FRICTION WELDING OF ALUMINUM AND FERROUS WORKPIECES

This application is a continuation-in-part of copending application Ser. No. 52,087 filed July 2, 1970, now abandoned.

BACKGROUND OF THE INVENTION

The present invention relates generally to a welding method in which welding heat is generated by friction when one workpiece is rotated relative to the other while being pressed together, and particularly to a method for friction welding an aluminum workpiece to a ferrous workpiece to provide a strong bond at the weld interface between them. As used herein, aluminum includes pure aluminum as well as aluminum alloys.

In welding workpieces having similar melting points by rotating one workpiece relative to and against the other (under pressure directed along the axis of the workpieces), heat is generated at the weld interface to soften both workpieces so that any irregularities at the contacting surfaces are rubbed smooth, and scale and reasonable amounts of foreign material on the surfaces are forced out of the weld area by virtue of a substantial radial flow of material at the interface. For this reason, prior preparation of contacting surfaces, and precise alignment of the workpieces in friction welding machines to provide parallel, true running surfaces, were of little importance.

This general philosophy of operation has heretofore been carried over to friction welding processes in which one of the two workpieces has a substantially lower melting point or range and is considerably softer than the other workpiece, for example, aluminum alloy and steel workpieces. Because of the relative softness of the aluminum alloy and its substantially lower melting temperature in comparison to steel, when the two such workpieces are friction welded together with substantial amounts of rotational energy imparted to the weld interface, the metal of the aluminum alloy flows excessively, resulting in substantial flash being formed on the periphery of the aluminum workpiece adjacent the weld interface, while that of the steel remains substantially unaffected. This substantial flow of the aluminum alloy occurs, for example, when the rotational energy input to the weld interface heats the aluminum member to or above the temperature range at which melting occurs for the alloy so that the metal of the aluminum alloy readily flows when axial pressure is applied to the workpieces during the weld cycle.

Further, a substantial flow and upset of the aluminum alloy occurs when the axial pressure exceeds substantially the yield strength of the aluminum alloy at the temperature to which it is heated even if this temperature is below the range in which the actual melting of the alloy occurs. As is well known, most metals and alloys have a temperature vs. yield strength characteristic which allows the metal in question to be more easily worked or displaced at higher temperatures than is possible at lower temperatures.

Aluminum-to-steel welds using the above-described welding processes in which substantial heat is generated at the weld interface, and in which substantial flow and upset of the aluminum occurs, have been found to be very fragile and brittle and thus easily broken at the interface. One reason for the brittleness, it is believed, is the excessive heating of the workpieces at the weld interface which results in substantial alloying of the aluminum and steel at the interface. This alloying, in turn, forms a weld zone containing a very brittle iron-aluminum compound having a thickness on the order of 0.0002 inch. This compound and the thickness thereof is sufficient to cause the brittle fragile weld.

BRIEF SUMMARY OF THE INVENTION

Briefly, the present invention involves a method for producing strong and substantially non-fragile weld joints between aluminum and ferrous working pieces by employing friction welding techniques. This is accomplished by first using workpieces that each have a true, clean and parallel planar surface for mutual engagement at the weld interface. One workpiece is rotated relative to the other and forced together at their parallel planar surfaces to heat the same. Axial pressure is then applied to the workpieces to pressure weld them together at the interface between the planar surfaces while the rotational, kinetic energy input to the weld is maintained between about 3,500 and 5,500 foot pounds per square inch. The aluminum workpiece is heated to a temperature below the temperature range at which melting occurs for the aluminum or alloy thereof, and the pressure at the interface is such that it does not exceed by a substantial amount the compressive yield strength of the aluminum workpiece at the temperature. In this manner, the radial flow of the aluminum workpiece is highly limited, the amount of flash produced being less than 10 percent of the weld area.

As can be appreciated, with the heat at the weld interface being below the melting range of the aluminum alloy, and well below that of the steel workpiece, there is little opportunity for the aluminum and steel to mix and form the brittle Al-Fe compound at the interface. Rather, the bond produced between the workpieces in the present invention is essentially that of a metallurgical bond in which molecules of the aluminum alloy and steel intermingle to form an extremely thin (though highly shock resistant) weld area, the thickness of the weld area being on the order of 0.00004 of an inch.

PREFERRED EMBODIMENT

The strong, shock-resistant weld, produced by the method of the present invention, can be effected by using friction welding machines available in the industry. Particulars of such machines and their operation are described in numerous United States patents, the following being a partial list of such U.S. Pat. Nos.: 3,134,278; 3,234,644; 3,235,157; 3,235,158; 3,235,159; 3,235,160; 3,235,162; 3,269,001; and 3,269,002.

Briefly, these and similar friction welding machines employ chucks and spindles for securing and relatively rotating the workpieces in axial alignment. A common machine includes a chuck and spindle on the headstock side for rotating one workpiece while the other workpiece is held against rotation in an axially translatable vise on the tailstock side of the machine. An amount of rotational, kinetic energy is supplied to the weld area during the welding cycle by the weight of the chuck and spindle, and weights can be added to provide additional energy to the spindle and weld if needed. A clutch can be employed between the additional weights and the spindle to disengage or declutch the spindle from the weights.

Specifically, the weld of the invention is effected by first trueing the surfaces of the aluminum and ferrous workpieces to provide true, clean, parallel welding surfaces before the surfaces for the welding process. This is best accomplished by machining the welding surfaces of both of the workpieces after they have been mounted and aligned in the welding machine so that with proper alignment of the workpieces, the machining operation can insure true, parallel, planar surfaces for the welding operation. The machining is preferably performed by cutting tools suitably mounted and operative on the welding machine so that time will not be expended in separate handling the workpieces for this operation, and to shorten the time between cleaning and welding thereby limiting the opportunity of the clean surfaces to become contaminated with foreign matter and excessive oxidation. A fly or milling (rotating) cutter can be used to face the workpiece held against rotation. The workpiece mounted for rotation can be faced by a cutting tool held against rotation but translatable into position against the end of the workpiece to machine the same while it is rotated.

After the ends or faces of the aluminum and ferrous workpieces are machined to present clean, planar surfaces for the welding operation, one of the workpieces is rotated relative to each other, and the workpieces then forced together at their clean, planar surfaces during rotation to form a weld area at the interface of the planar surfaces. The workpieces are forced together using an axial force of at least 30,000 pounds per square inch of the weld area, and a kinetic energy input to the weld area (provided by the rotating workpiece or pieces and the associated rotating components of the welding machine) between about 3,500 and about 5,500 foot pounds per square inch of the weld area.

The axial pressure is effective to weld the workpieces together while the kinetic energy supplied to the weld area is low enough to maintain the temperature of the aluminum workpiece below the temperature range at which melting occurs. Since the aluminum workpiece is below its melting temperature, the temperature of the ferrous workpiece is substantially below its melting temperature. With virtually no melting of either workpiece there is substantially no mixing of the ferrous and aluminum metal so that the brittle Al-Fe compound is not formed at the interface. As explained earlier, the weld provided by the present invention is essentially a metallurgical bond in which the molecules of the aluminum and ferrous metal intermingle to form an extremely thin weld area, the thickness thereof being on the order of 0.00004 of an inch. Such a bond has proven to be extremely shock-resistant as shown by impact strength tests described hereinafter.

Further, with substantially no melting at the weld interface, radial flow of the workpiece metal is highly limited, there being little flash produced around periphery of the workpiece adjacent the weld area.

A further factor limiting metal flow and the amount of flash produced is the compressive yield strength of the aluminum workpiece at the temperature provided by the limited range of kinetic energy input to the weld described above. At said temperature, which is below the melting temperature range of the aluminum workpiece, the compressive yield strength of the aluminum is such that it offers substantial resistance to excessive metal flow of the aluminum at the weld interface, the amount of flash produced being less than 10 percent of the weld area. Again, there is little opportunity for the alloying of aluminum-ferrous metals which form the brittle Al-Fe compound, and the upset of the aluminum workpiece is essentially negligible.

To test the welds effected by the method of the invention, 4 × 7 × 40 inch bars of aluminum alloy 6101–T6 were welded to carbon steel rods 6 inches in diameter and 8 ½ inches long on a Special Model 140A friction welding machine made by American Machine & Foundry, and capable of delivering up to 600,000 pounds of axial force. The weld end of the aluminum bar was provided with a circular end of about 6 to 8 inches in diameter to center on that of the steel workpiece. The aluminum bar was held against rotation (as provided by the AMF machine) while the steel rod was rotated. The aluminum bar was then translated axially under pressure into engagement with the rotating steel workpiece to effect the weld. The majority of the welds tested were made with one face of the weld interface counterbored.

The welds were tested by supporting the span of each specimen near the opposed ends thereof, the span being on the order of 39 ½ inches. The span and weld area between the supports was unsupported, and a mass weighing 136 pounds was positioned directly over the specimen. A striking block was placed on the aluminum bar directly beneath the mass at 4 to 6 inches from the weld interface. The mass was dropped repeatedly in a free falling manner on each specimen from heights up to and including 14 feet. Though there was some scatter of results, many of welds effected by the method of the present invention were not broken.

Weld specimens made using kinetic energy inputs above 5,500 foot pounds per square inch of weld area, however, showed a definite decrease in impact strength. These specimens were easily broken by minimum amounts of impact energy indicating an extremely brittle weld area. The weld areas of some of these specimens were brittle to point that they broke with simple handling of the specimens, for example, when the specimens were removed from the welding machine after the welding process.

In contrast thereto, as the input energy was reduced to the range explained above and the heat at the weld interface was maintained at a temperature below the melting point of the aluminum workpiece and by providing clean, parallel welding surfaces, the impact strength of the welds showed a substantial increase to the point, as explained above, where the welds could not be broken by impacts of the 136 pound weight.

From the foregoing description it should now be apparent that a new and useful friction welding method has been disclosed in which aluminum and ferrous workpieces are welded together without a fragile, aluminum-iron compound being formed in the weld interface. This is accomplished by first providing weld surfaces that are clean and parallel before the surfaces are forced together under axial, welding pressure. Secondly, the kinetic energy input to the weld area is maintained between about 3,500 and 5,500 foot pounds per square inch of weld area so that the temperature of the weld area is kept below the temperature range at which the aluminum melts and the yield strength thereof is not substantially exceeded by the axial pressure. In this manner the flow and upset of the aluminum workpiece is highly limited, the thickness of the weld area formed being on the order of 0.00004 of an inch, and the amount of flash produced being less than 10 percent of the weld area.

While the invention has been described in terms of preferred embodiments, the claims appended hereto are intended to encompass all embodiments which fall within the spirit of the invention.

Having thus described my invention and certain embodiments thereof, I claim:

1. In a method of joining a planar surface of an aluminum workpiece to the planar surface of a ferrous workpiece by rotating one of said workpieces relative to the other, and during such relative rotation forcing said planar surfaces together by the application of axial pressure sufficient to frictionally heat and pressure weld such workpieces together at the interface between the planar surfaces while maintaining an input of kinetic energy thereto between about 3,500 and about 5,500 foot pounds of weld area, the improvement comprising maintaining the temperature of said aluminum workpiece at the interface during the welding step at a level below that at which melting of the workpiece occurs, the radial displacement of the metal of said aluminum workpiece at the interface being held below 10 percent per square inch of the weld area.

2. The method of claim 1 including the additional step of trueing the planar surfaces of the workpieces before they are welded together to insure true, clean and parallel surfaces.

* * * * *

UNITED STATES PATENT OFFICE
CERTIFICATE OF CORRECTION

Patent No. 3,693,238          Dated September 26, 1972

Inventor(s) Fred R. Hoch and James W. McIntee

It is certified that error appears in the above-identified patent and that said Letters Patent are hereby corrected as shown below:

Col. 6, line 6      After "pounds" insert --per square inch--

Col. 6, line 14     After "percent" cancel --per square inch--

Signed and sealed this 20th day of February 1973.

(SEAL)
Attest:

EDWARD M. FLETCHER, JR.                ROBERT GOTTSCHALK
Attesting Officer                      Commissioner of Patents